US012615537B2

(12) United States Patent
Laddu et al.

(10) Patent No.: US 12,615,537 B2
(45) Date of Patent: Apr. 28, 2026

(54) DEVICES, METHODS AND APPARATUSES FOR BEAM REPORTING

(71) Applicant: Nokia Technologies Oy, Espoo (FI)

(72) Inventors: Keeth Saliya Jayasinghe Laddu, Espoo (FI); Qiping Zhu, Naperville, IL (US); Andrea Bonfante, Massy (FR)

(73) Assignee: Nokia Technologies Oy, Espoo (FI)

( * ) Notice: Subject to any disclaimer, the term of this patent is extended or adjusted under 35 U.S.C. 154(b) by 317 days.

(21) Appl. No.: 18/457,892

(22) Filed: Aug. 29, 2023

(65) Prior Publication Data

US 2024/0098543 A1 Mar. 21, 2024

Related U.S. Application Data

(60) Provisional application No. 63/375,865, filed on Sep. 16, 2022.

(51) Int. Cl.
| | |
|---|---|
| *H04B 17/20* | (2015.01) |
| *H04B 17/24* | (2015.01) |
| *H04W 8/22* | (2009.01) |
| *H04W 24/08* | (2009.01) |
| *H04W 24/10* | (2009.01) |
(Continued)

(52) U.S. Cl.
CPC ............ *H04W 24/10* (2013.01); *H04B 17/24* (2015.01); *H04B 17/252* (2023.05); *H04W 8/22* (2013.01); *H04W 24/08* (2013.01); *H04W 72/046* (2013.01); *H04W 84/02* (2013.01);
(Continued)

(58) Field of Classification Search
CPC .. H04B 7/02–12; H04B 17/0082–3913; H04L 5/0001–0098; H04W 8/22–245; H04W 24/02–10; H04W 36/0005–385; H04W 56/001–0025; H04W 72/02–569; H04W 84/02–16; H04W 88/02–12; H04W 92/02–04; H04W 92/10
See application file for complete search history.

(56) References Cited

U.S. PATENT DOCUMENTS

2022/0190883 A1 * 6/2022 Kaya ................... H04W 36/085
2023/0025432 A1 * 1/2023 Da Silva ....... H04W 36/008375

FOREIGN PATENT DOCUMENTS

WO WO-2024030066 A1 * 2/2024 ......... H04B 7/06952

OTHER PUBLICATIONS

"3rd Generation Partnership Project; Technical Specification Group Radio Access Network; NR; Physical layer procedures for data (Release 17)", 3GPP TS 38.214, V17.2.0, Jun. 2022, pp. 1-228.
(Continued)

*Primary Examiner* — Timothy J Weidner
(74) *Attorney, Agent, or Firm* — Nokia Technologies Oy

(57) ABSTRACT

Embodiments of the present disclosure disclose devices, methods and apparatuses for a beam reporting. A terminal device receives a beam reporting configuration from a network device. The beam reporting configuration indicates at least one set of beams for at least one of beam measurements or beam predictions. Each beam of at least one set of beams is associated with a cell of multiple cells which are able to be measured by the terminal device. Then, the terminal device performs a reporting of at least one beam associated with the at least one set of beams based on the beam reporting configuration. The at least one beam comprises a predicted beam which is associated to a cell of multiple cells.

18 Claims, 5 Drawing Sheets

(51) Int. Cl.

| | |
|---|---|
| *H04W 72/044* | (2023.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC ............ *H04W 88/02* (2013.01); *H04W 88/08* (2013.01); *H04W 92/02* (2013.01); *H04W 92/10* (2013.01)

(56) References Cited

OTHER PUBLICATIONS

"3rd Generation Partnership Project; Technical Specification Group Radio Access Network; NR; Radio Resource Control (RRC) protocol specification (Release 17)", 3GPP TS 38.331, V17.1.0, Jun. 2022, pp. 1-1273.

"New SI: Study on Artificial Intelligence (AI)/Machine Learning (ML) for NR Air Interface", 3GPP TSG RAN Meeting #94e, RP-213599, Agenda: 8.6.1, Qualcomm, Dec. 6-17, 2021, 6 pages.

"IEEE 802.11", Wikipedia, Retrieved on Sep. 24, 2023, Webpage available at : https://en.wikipedia.org/wiki/IEEE_802.11.

"Other aspects on ML for beam management", 3GPP TSG RAN WG1 #111 meeting, R1-2212330, Agenda: 9.2.3.2, Nokia, Nov. 14-18, 2022, 23 pages.

"Other aspects on ML for beam management", 3GPP TSG RAN WG1 #112 meeting, R1-2300607, Agenda: 9.2.3.2, Nokia, Feb. 27-Mar. 3, 2023, 26 pages.

"AI/ML for NG-RAN", 3GPP TSG RAN Rel-19 workshop, RWS-230023, Agenda: 5, Nokia, Jun. 15-16, 2023, pp. 1-6.

* cited by examiner

DEVICES, METHODS AND APPARATUSES FOR BEAM REPORTING

CROSS-REFERENCE TO RELATED APPLICATION

This application claims priority of U.S. Provisional Application No. 63/375,865 filed on Sep. 16, 2022, which is hereby incorporated by reference in its entirety.

FIELD

Embodiments of the present disclosure generally relate to the field of communication, and in particular, to devices, methods, apparatuses and computer readable storage medium for beam reporting.

BACKGROUND

With the development of communication technology, multi-transmit and receive point (TRP) operation has been introduced to improve the performance of communication between terminal devices and network devices. Each TRP for the multi-TRP operation may provide a plurality of beams. Accordingly, enhancement of the beam management (BM) capability for multi-TRP operation (or for cells provided by the multi-TRP operation), for example, prediction based beam reporting, can facilitate the beam assignment and/or update for terminal devices in the multi-TRP operation, thereby improving communication performance.

The artificial intelligence (AI) or machine learning (ML) model may be employed in various communication systems recently. Proper utilization of the AI or ML model in the above BM is also desirable for enhanced performance and/or reduced complexity/overhead.

SUMMARY

In general, example embodiments of the present disclosure provide devices, methods, apparatuses and computer readable storage medium for beam reporting.

In a first aspect, there is provided a terminal device. The terminal device may comprise one or more transceivers; and one or more processors communicatively coupled to the one or more transceivers, and the one or more processors are configured to cause the terminal device to: receive a beam reporting configuration from a network device, the beam reporting configuration indicating at least one set of beams for at least one of beam measurements or beam predictions, wherein each beam of at least one set of beams is associated with a cell of multiple cells which are able to be measured by the terminal device; and perform, based on the beam reporting configuration, a reporting of at least one beam associated with the at least one set of beams, wherein the at least one beam comprises a predicted beam which is associated to a cell of multiple cells.

In a second aspect, there is provided a network device. The network device may comprise one or more transceivers; and one or more processors communicatively coupled to the one or more transceivers, and the one or more processors are configured to cause the network device to: transmit a beam reporting configuration to a terminal device, the beam reporting configuration indicating at least one set of beams for at least one of beam measurements or beam predictions, wherein each beam of at least one set of beams is associated with a cell of multiple cells which are able to be measured by the terminal device; and receive from the terminal device, a reporting of at least one beam associated with the at least one set of beams, wherein the at least one beam comprises a predicted beam which is associated with a cell of multiple cells.

In a third aspect, there is provided a method implemented at a terminal device. The method comprises: receiving a beam reporting configuration from a network device, the beam reporting configuration indicating at least one set of beams for at least one of beam measurements or beam predictions, wherein each beam of at least one set of beams is associated with a cell of multiple cells which are able to be measured by the terminal device; and performing, based on the beam reporting configuration, a reporting of at least one beam associated with the at least one set of beams, wherein the at least one beam comprises a predicted beam which is associated to a cell of multiple cells.

In a fourth aspect, there is provided a method implemented at a network device. The method comprises: transmitting a beam reporting configuration to a terminal device, the beam reporting configuration indicating at least one set of beams for at least one of beam measurements or beam predictions, wherein each beam of at least one set of beams is associated with a cell of multiple cells which are able to be measured by the terminal device; and receiving, from the terminal device, a reporting of at least one beam associated with the at least one set of beams, wherein the at least one beam comprises a predicted beam which is associated with a cell of multiple cells.

In a fifth aspect, there is provided an apparatus of a terminal device. The apparatus comprises: means for receiving a beam reporting configuration from a network device, the beam reporting configuration indicating at least one set of beams for at least one of beam measurements or beam predictions, wherein each beam of at least one set of beams is associated with a cell of multiple cells which are able to be measured by the terminal device; and means for performing, based on the beam reporting configuration, a reporting of at least one beam associated with the at least one set of beams, wherein the at least one beam comprises a predicted beam which is associated to a cell of multiple cells.

In a sixth aspect, there is provided an apparatus of a network device. The apparatus comprises: means for transmitting a beam reporting configuration to a terminal device, the beam reporting configuration indicating at least one set of beams for at least one of beam measurements or beam predictions, wherein each beam of at least one set of beams is associated with a cell of multiple cells which are able to be measured by the terminal device; and means for receiving, from the terminal device, a reporting of at least one beam associated with the at least one set of beams, wherein the at least one beam comprises a predicted beam which is associated with a cell of multiple cells.

In a seventh aspect, there is provided a terminal device. The terminal device may comprise at least one processor; and at least one memory including computer program codes, wherein the at least one memory and the computer program codes are configured to, with the at least one processor, cause the terminal device to: receive a beam reporting configuration from a network device, the beam reporting configuration indicating at least one set of beams for at least one of beam measurements or beam predictions, wherein each beam of at least one set of beams is associated with a cell of multiple cells which are able to be measured by the terminal device; and perform, based on the beam reporting configuration, a reporting of at least one beam associated with the at least one set of beams, wherein the at least one beam comprises a predicted beam which is associated to a cell of multiple cells.

In an eighth aspect, there is provided a network device. The network device may comprise at least one processor; and at least one memory including computer program codes, wherein the at least one memory and the computer program codes are configured to, with the at least one processor, cause the network device: to transmit a beam reporting configuration to a terminal device, the beam reporting configuration indicating at least one set of beams for at least one of beam measurements or beam predictions, wherein each beam of at least one set of beams is associated with a cell of multiple cells which are able to be measured by the terminal device; and receive, from the terminal device, a reporting of at least one beam associated with the at least one set of beams, wherein the at least one beam comprises a predicted beam which is associated with a cell of multiple cells.

In a ninth aspect, there is provided a non-transitory computer readable medium comprising program instructions for causing an apparatus to perform at least the method according to third or fourth aspect.

In a tenth aspect, there is provided a computer program comprising instructions, which, when executed by an apparatus, cause the apparatus at least to: receive a beam reporting configuration from a network device, the beam reporting configuration indicating at least one set of beams for at least one of beam measurements or beam predictions, wherein each beam of at least one set of beams is associated with a cell of multiple cells which are able to be measured by the terminal device; and perform, based on the beam reporting configuration, a reporting of at least one beam associated with the at least one set of beams, wherein the at least one beam comprises a predicted beam which is associated to a cell of multiple cells.

In an eleventh aspect, there is provided a computer program comprising instructions, which, when executed by an apparatus, cause the apparatus at least to: transmit a beam reporting configuration to a terminal device, the beam reporting configuration indicating at least one set of beams for at least one of beam measurements or beam predictions, wherein each beam of at least one set of beams is associated with a cell of multiple cells which are able to be measured by the terminal device; and receive, from the terminal device, a reporting of at least one beam associated with the at least one set of beams, wherein the at least one beam comprises a predicted beam which is associated with a cell of multiple cells In a twelfth aspect, there is provided a terminal device. The terminal device comprises receiving circuitry configured to: receive a beam reporting configuration from a network device, the beam reporting configuration indicating at least one set of beams for at least one of beam measurements or beam predictions, wherein each beam of at least one set of beams is associated with a cell of multiple cells which are able to be measured by the terminal device; and a performing circuitry configured to perform, based on the beam reporting configuration, a reporting of at least one beam associated with the at least one set of beams, wherein the at least one beam comprises a predicted beam which is associated to a cell of multiple cells.

In a thirteenth aspect, there is provided a network device. The network device comprises transmitting circuitry configured to: transmit a beam reporting configuration to a terminal device, the beam reporting configuration indicating at least one set of beams for at least one of beam measurements or beam predictions, wherein each beam of at least one set of beams is associated with a cell of multiple cells which are able to be measured by the terminal device; and receiving circuitry configured to receive, from the terminal device, a reporting of at least one beam associated with the at least one set of beams, wherein the at least one beam comprises a predicted beam which is associated with a cell of multiple cells.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
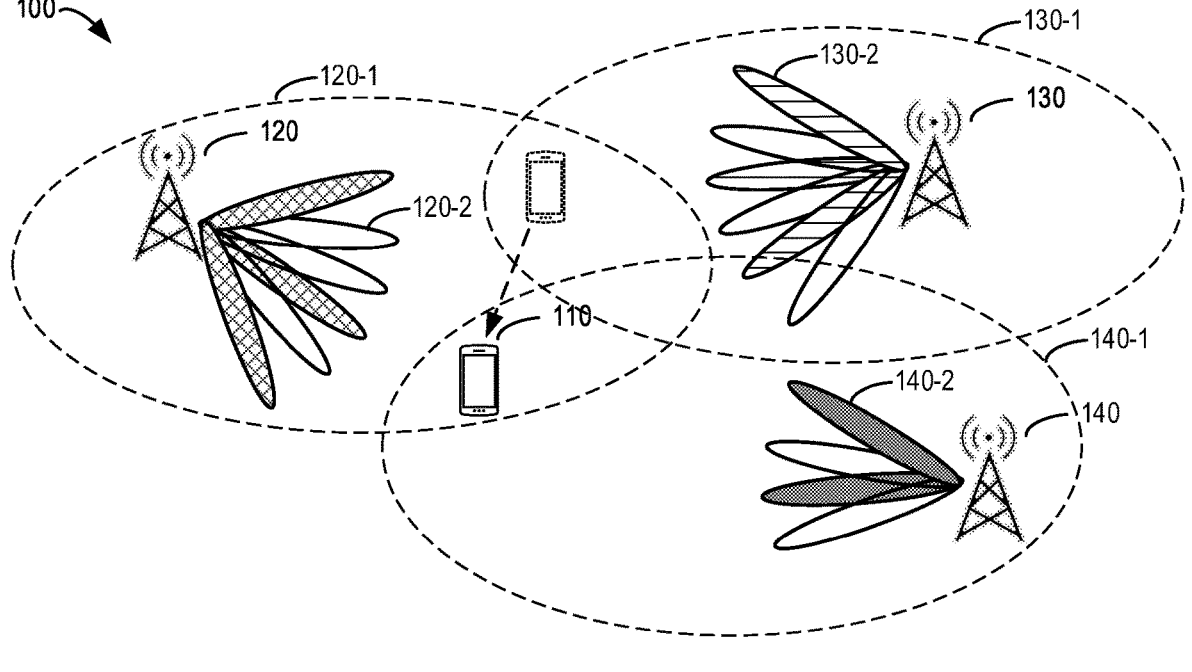
FIG. 1 illustrates an example network environment in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein may be implemented in various manners other than the ones described below.

In the following description and claims, unless defined otherwise, all technical and scientific terms used herein have the same meaning as commonly understood by one of ordinary skills in the art to which the present disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It may be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/of" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s) that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as long term evolution (LTE), LTE-advanced (LTE-A), wideband code division multiple access (WCDMA), high-speed packet access (HSPA), narrow band Internet of things (NB-IoT) and so on. Furthermore, the communications between a terminal device and a network device in the communication network may be performed according to any suitable generation communication protocols, including, but not limited to, the third generation (3G), the fourth generation (4G), 4.5G, the fifth generation (5G) communication protocols, and/or beyond. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a remote radio unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, the enhancement of the BM capability for multi-TRP operation is beneficial for improving the performance of communication. The beam management may include beam measurement, beam prediction, beam reporting, beam configuration, beam activation, and/or beam indication. The BM may be for intra-cell or inter-cell. In some embodiments, the beam management may be performed within a single cell provided by a network device, for example, a TRP which may be a serving cell or another cell. Such beam management may be called as intra-cell BM, intra-site BM, intra-TRP BM or intra-physical cell identity (PCI) BM in the present disclosure; and the protection scope of the present disclosure is not limited in this respect.

For further improving the communication performance at a terminal device, in some cases, inter-cell operations including, for example, beam measurement, prediction and/or beam reporting may be required to support characteristics like inter-cell BM, inter-cell multi-DCI and/or multi-TRP operation. In the present disclosure, the inter-cell BM may refer to performing at least one of the beam measurement, the beam prediction, the beam report, beam configuration, beam activation, and/or beam indication of beams across multiple cells, for example, across the serving cell of a terminal device and at least one another cell that can be measured by the terminal device. The inter-cell BM may be also referred to as inter-site BM, inter-PCI BM, or inter-TRP BM, or any other suitable term; and the protection scope of the present disclosure is not limited in this respect.

In some embodiments, intra-cell may indicate a gNB which provides one or more beams for a user device for communication. In some embodiments, inter-cell may indicate a cell or cell group providing service for a user device for communication. In some embodiments, inter-cell may indicate two or more (physical) cells associate with one TRP respectively providing service for a user device, and the TRPs associated with the cells belong to a same or different gNBs.

As used herein, the term "beam" may refer to a communication resource. Different beams may be considered as different resources. A beam may also be represented as a spatial filter. A technology for forming a beam may be a beamforming technology or another technology. The beamforming technology may be specifically a digital beamforming technology, analog beamforming technology, or a hybrid digital/analog beamforming technology. A communication device (including the terminal device and the network device) may communicate with another communication device through one or more beams. One beam may include one or more antenna ports and be configured for a data channel, a control channel, or the like. One or more antenna ports forming one beam may also be considered as an antenna port set. A beam may be configured with a set of resource, or a set of resource for measurement, and a beam may be represent by for example a reference signal and/or related resource for the reference signal. A beam may also represent by a reference cell identifier or resource identifier.

In the multi-TRP operation, a TRP of the multiple TRPs performing data transmission towards a terminal device may be associated with a specific PCI, respectively; for example, each TRP may provide a cell having the corresponding PCI. For the inter-cell BM, a BM framework allows to measure beams from more than one cells and report them towards a network device, such that network can select the best beams for each TRP. In the case that a terminal device moves through multiple cells provided by multiple TRPs, there may be more than one TRP or PCI associated with beam measurements and predictions accordingly. Therefore, a framework to support a flexible beam prediction, especially, for inter-cell operations is needed.

However, currently, the beam prediction is performed at network devices and the terminal device may not be able to predict best beams across network devices or sites, since the global information on beams may be not aware by the terminal device, and the beam measurements across multi-cells and the predictor for multi-cells might be too complicated to handle. Further, given that the inter-cell BM involves multi parties (for example, beams associated with multi-cells), and an AI or ML model trained for a general situation might hardly have the best performance since for example, the generalization capabilities of ML models may be limited, and thus adopting a model trained for all possible scenarios may lead to poor prediction performance.

Therefore, it is hard to implement the inter-cell BM at the terminal device with a suitable AI or ML model, especially for the inter-cell BM.

According to embodiments of the present disclosure, a terminal device receives a beam reporting configuration from a network device. The beam reporting configuration indicates at least one set of beams for at least one of beam measurements or beam predictions. Each beam of the at least one set of beams is associated with a cell of multiple cells which are able to be measured by the terminal device. Then, the terminal device perform a reporting of at least one beam associated with the at least one set of beams based on the beam reporting configuration. The at least one beam includes a predicted beam which is associated to a cell of multiple cells. In this way, with the beam reporting configuration, the inter-cell BM can be implemented at the terminal device efficiently, and the AI or ML model may be employed in the inter-cell BM properly based on the association between the beams and cells.

For illustrative purposes, principle and example embodiments of the present disclosure for the inter-cell BM will be described below with reference to FIGS. 1-7. However, it is to be noted that these embodiments are given to enable the skilled in the art to understand inventive concepts of the present disclosure and implement the solution as proposed herein, and not intended to limit scope of the present application in any way.

FIG. 1 illustrates an example network environment 100 in which example embodiments of the present disclosure may be implemented. The environment 100, which may be a part of a communication network, includes terminal devices and network devices.

As illustrated in FIG. 1, the communication network 100 may include a terminal device 110 (hereinafter may also be referred to as user equipment 110 or a UE 110). The communication network 100 may further include a network device 120, a network device 130 and a network device 140 (hereinafter may also be referred to as a TRP or site). Each network device of these network devices may manage one or more cells. As an example, the cell 120-1 (which may be also referred to as a first cell) may be managed by the network device, the cell 130-1 (which may be also referred to as a second cell) may be managed by the network device 130, and the cell 140-1 (which may be also referred to as a third cell) may be managed by the network device 140. In addition, the network device 120 is configured with a plurality of beams 120-2 which provides coverage for the cell 120-1, the network device 130 is configured with a plurality of beams 130-2 which provide coverage for the cell 130-1 and the network device 140 is configured with a plurality of beams 140-2 which provide coverage for the cell 140-1. In an example, the terminal device 110 may transmit or receive within a cell via the beam providing the coverage for this cell. The terminal device 110 may move through cells provided by different network devices. For example, the terminal device 110 moves from the cell 130-1 to the cell 140-1. In this case, in order to perform inter-cell BM, a set of beams for the beam measurement and another set of beams for beam prediction may be indicated to the terminal device. The set of beams for the beam measurement may include beams associated with different cells or different network devices. Similarly, the set of beams for the beam prediction may also include beams associated with one or more cells or network devices.

For illustrative purposes, the inter-cell BM process will be discussed in detail as below. In the present disclosure, only as an example, the cell 120-1 may be the serving cell of the terminal device 110; the cell 130-1 and the cell 140-1 may be other cells that are able to be measured by the terminal device 110. Alternatively, the cell 130-1 and the cell 140-1 may be the cells from which the signals (for example, a reference signal) are detectable by the terminal device 110.

It is to be understood that the number of network devices and terminal devices is given only for the purpose of illustration without suggesting any limitations. The system 100 may include any suitable number of network devices and/or terminal devices adapted for implementing embodiments of the present disclosure. Although not shown, it would be appreciated that one or more terminal devices may be located in the environment 100.

Communications in the network environment 100 may be implemented according to any proper communication protocol(s), comprising, but not limited to, the third generation (3G), the fourth generation (4G), the fifth generation (5G) or beyond, wireless local network communication protocols such as institute for electrical and electronics engineers (IEEE) 802.11 and the like, and/or any other protocols currently known or to be developed in the future. Moreover, the communication may utilize any proper wireless communication technology, comprising but not limited to: multiple-input multiple-output (MIMO), orthogonal frequency division multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), carrier aggregation (CA), dual connection (DC), and new radio unlicensed (NR-U) technologies.

Figure 2:
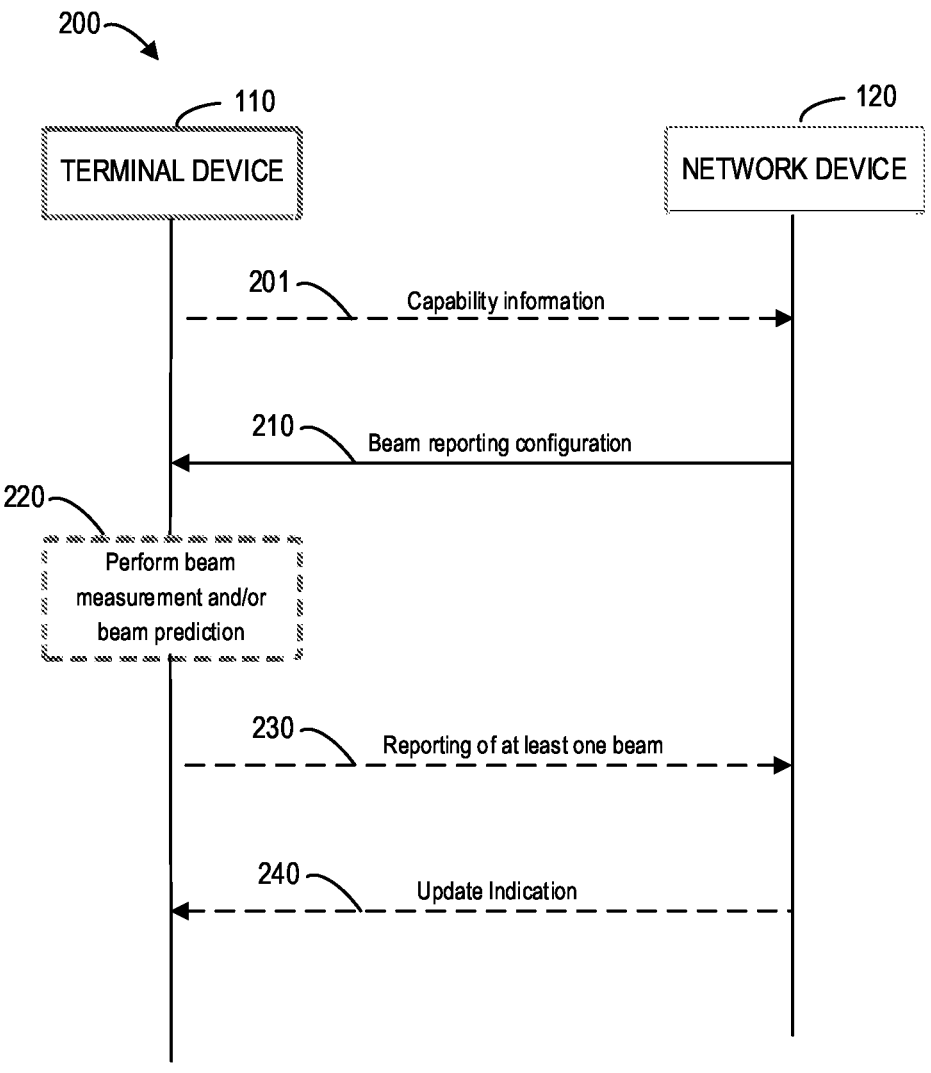
FIG. 2 illustrates an example signaling process for the beam reporting according to some embodiments of the present disclosure.

FIG. 2 illustrates an example signaling process 200 for beam reporting according to some embodiments of the present disclosure. For the purpose of discussion, the process 200 will be described with reference to FIG. 1. The process 200 may involve the terminal device 110 and network devices 120, 130 and 140 as illustrated in FIG. 1. It would be appreciated that although the process 200 has been described in the communication environment 100 of FIG. 1, this process may be likewise applied to other communication scenarios with similar issues.

In the process 200, at 210, the terminal device 110 receives a beam reporting configuration from a network device. The beam reporting configuration indicates at least one set of beams for at least one of beam measurements or beam predictions; in other words, the at least one set of beams may be used for beam measurement, may be used for beam prediction, or may be for both beam measurement and beam prediction. Each beam of the at least one set of beams is associated with a cell of multiple cells which are able to be measured by the terminal device. In some embodiments, the network device as mentioned above may be the network device providing the serving cell of the terminal device 110, for example, the network device 120. Alternatively, the network device may be also the network device 130 and the network device 140. Without any limitation, in the following embodiments, the network device 120 will be taken as an example of the serving cell of the terminal device to describe embodiments of the present disclosure.

With the beam reporting configuration, the terminal device 110 may be aware of the information on the beams for the inter-cell BM, for example, information on those beams for beam measurement associated with multiple cells and/or, those beams for beam prediction. As such, the inter-cell BM may be implemented at the terminal device 110 appropriately. For example, the terminal device 110 can perform the beam measurement and/or the beam prediction based on the association between the beams and the cells indicated by the beam reporting configuration. In some embodiments, each beam of the at least one set of beams is associated with the identity (ID) of the cell of multiple cells, which identifies this cell. For example, the identity of the cell may include at least one of a PCI or a global cell ID of the cell.

In some embodiments, the at least one set of beams may include a set of beams for the beam prediction and another set of beams for the beam measurement. In the present disclosure, the set of beams for the beam prediction may be also referred to as a first set of beams, or set A and the set of beams for the beam measurement may be also referred to as a second set of beams, or set B. The first set of beams and the second set of beams may be configured by the same configuration message or in separate configuration messages. In turn, in some embodiments, based on the beam reporting configuration, the terminal device 110 may perform the beam prediction on the first set of beams based on a measurement result of the second set of beams.

In some embodiments, the first set of beams for the beam prediction may include one of a first subset of beams associated with a serving cell 120-1 of the terminal device 110 or a second subset of beams associated with at least one another cell, for example, the cell 130-1 and/or the cell 140-1. In an example, the first set of beams may only include the first subset of beams associated with a serving cell of 120-1, and in this case, the first set itself is the first subset associated with a serving cell of 120-1. In another example, the first set of beams may only include the first subset of beams associated with at least one another cell different from the serving cell, for example, the cell 130-1 and/or the cell 140-1. Alternatively, the first set of beams may include both the first subset of beams associated with the serving cell 120-1 and the second subset of beams associated with the at least one another cell.

In addition, the second set of beams for the beam measurement may include a third subset of beams associated with the serving cell 120-1 of the terminal device 110 and a fourth subset of beams associated with the at least one another cell, for example, the cell 130-1 and/or the cell 140-1. The beams for the beam measurement of a cell may be a portion of all the beams of this cell. In some embodiments, the second subset (for beam prediction, for example) associated with another cell/another PCI (for example, the cell 130-1) and the fourth subset (for beam measurement for example) associated with the same other cell/other PCI (i.e., the cell 130-1) may be two independent subsets. Alternatively, the second subset (for beam prediction, for example) associated with another cell/another PCI may be a portion of the fourth subset (for beam measurement, for example) associated with the same other cell/other PCI. Alternatively, the fourth subset (for beam measurement, for example) associated with another cell/another PCI may be a portion of the second subset (for beam prediction, for example) associated with the same other cell/other PCI. The relationship between the subset of beams for the beam measurement associated with a cell/PCI and the subset of beams for the beam prediction associated with the same cell/PCI is not limited in the present disclosure. In addition, the first subset and the third subset may be configured in the same way.

In some embodiments, the terminal device 110 may perform the beam measurement across multiple cells and perform the beam prediction for a single cell, for example, for one of the serving cell 120-1, the cell 130-1 and the cell 140-1. In the present disclosure, the beam prediction for the single cell may be also referred to as an intra-cell beam prediction. In addition or alternatively, the terminal device 110 may perform the beam measurement across multiple cells and perform the beam prediction for more than one cell of the serving cell 120-1, the cell 130-1 and the cell 140-1. The beam prediction for more than one cell may be performed sequentially or in parallel. In the present disclosure, the beam prediction for multiple cells may be also referred to as an inter-cell beam prediction.

In some embodiments, the terminal device 110 may optionally transmit, at 201, capability information on beam prediction to the network device 120. The beam prediction capability may indicate at least one of an intra-cell beam prediction, an inter-cell beam prediction, a time domain beam prediction; and a spatial domain beam prediction. The capability information may be carried in any of a radio resource control (RRC) signaling and a medium access control (MAC) control element (CE). In some embodiments, the network device 120 may determine the beam reporting configuration for the terminal device at least partially based on the capability information. For example, the network device 120 may configure the terminal device 110 with the first set of beams for bean prediction and/or the second set of beams for beam measurement based on whether the terminal device 110 supports the intra-cell beam prediction or the inter-cell beam prediction.

If the capability information indicates that the terminal device 110 supports the intra-cell beam prediction, in some embodiments, the network device 120 may configure the terminal device 110 with the beam reporting configuration for the intra-cell beam prediction. In an example, the first set of beams for the beam prediction in the beam reporting configuration may include a plurality of beams of which each is associated with the same cell, for example, one of the serving cell 120-1, the cell 130-1 and the cell 140-1.

In case that the capability information indicates that the terminal device 110 supports the inter-cell prediction, the network device 120 may configure the beam reporting configuration for the inter-cell beam prediction. In some embodiments, the first set of beams for the beam prediction in the beam reporting configuration may include a subset of beams associated with the serving cell and at least one another subset of beams associated with another cell. For example, the first set of beams may include the first subset of beams associated with the serving cell 120-1 and the second subset of beams associated with another cell, for example, the cell 130-1 and the cell 140-1. Alternatively, the first set of beams may also include more than one subset of beams associated with cells other than the serving cell 120-1. In addition, the second set of beams for the beam measurement in the beam reporting configuration may be configured in the same way as mentioned in the above intra-cell prediction.

In addition, the capability information transmitted at 201 may further include at least one of: a number of channel state information reference signal resource indication-reference signal received power, CRI-RSRP, which is supported to be contained in a beam report; a number of synchronization signal/physical broadcast channel block resource indication-reference signal received power, SSBRI-RSRP, which is supported to be contained in a beam report; the maximum number of configured cell identities other than from the identity of a serving cell; and the maximum number of SSB resources configured for measuring Layer 1-RSRP within a slot for at least one of the serving cell or another cell.

In turn, at 220, the terminal device 110 performs at least one of the beam measurement and the beam prediction.

In some embodiments, the terminal device 110 supports the intra-cell beam prediction and in such a case, it may perform the beam measurement on the second set of beams which involve multiple cells, and perform an intra-cell beam prediction for the same cell. The same cell may be the serving cell 120-1 or another cell, for example, the cell 130-1 or the cell 140-1. As an example, without any limitation, beams of the first set of beams in this embodiment may be associated with the serving cell 120-1, i.e., the first set of beams only includes the first subset of beams as mentioned above. It is to be understood that beams of the first set of beams may be also associated with another single cell.

For the beam measurement, the terminal device 110 may measure the beams from the third subset of beams and the fourth subset of beams. Further, terminal device 110 may perform the beam prediction on the first set of beams based on the beam measurement. In some embodiments, the terminal device 110 may use the measurement result of the third subset of beams which is also associated with the serving cell 120-1 as an input of an AI or ML model for the beam prediction.

In turn, the terminal device 110 may perform the beam prediction on the first set of beams by means of the AI or ML model. The AI or ML model may be trained for the intra-cell prediction. In some embodiments, the AI or ML model is trained for a single PCI. In this way, the beam prediction may be associated with a given PCI (serving cell PCI) and not considering more than one PCI at a given time. As such, the AI or ML model can be trained to have a better performance than the general model.

In some embodiments, the terminal device 110 supports the inter-cell beam prediction and in such a case the terminal device 110 may perform the beam measurement on the second set of beams in the same way as mentioned above. In addition, the terminal device 110 may perform inter-cell beam prediction for the cells associated with the beams in the first set of beams. For illustrative purposes and without any limitation, it is assumed that the first set of beams for beam prediction includes the first subset of beams associated with the serving cell 120-1, and the second subset of beams associated with the cell 130-1. The second set of beams includes the third subset of beams associated with the serving cell 120-1, and the fourth subset of beams associated with the cell 130-1.

In the inter-cell beam prediction, the terminal device 110 may perform the beam prediction for a cell based on the beam measurement of the beams associated with this cell. For example, the terminal device 110 may perform the beam prediction on the first subset of beams, based on the beam measurement on the third subset of beams. In addition, terminal device 110 may perform the beam prediction on the second subset of beams, based on the beam measurement on the fourth subset of beams. Similarly, the terminal device 110 may use the measurement result of the corresponding subset of beams for the beam measurement as an input of an AI or ML model for the beam prediction, wherein the corresponding subset of beams (for example, the third subset of fourth subset of beams) is associated with the cell to be predicted. In turn, the terminal device 110 may perform the beam prediction on the subset of beams for the beam prediction (for example, the first subset or second subset of beams) by means of the AI or ML model. The AI or ML model may be trained for the inter-cell prediction.

In some embodiments, the AI or ML model trained for the inter-cell prediction may be a one predictor model which suits to predict inter-cell/inter-PCI/inter-site/inter-TRP beams. Alternatively, the AI or ML model may include a plurality of ML or AI models respectively for inter-cell beam prediction of multiple cells. In this case, the terminal device 110 may perform the beam prediction by using the plurality of ML or AI models of which a model is applied for each cell/site/PCI/TRP. The prediction for the cells in the inter-cell beam prediction may be performed sequentially or in parallel at the terminal device 110.

Then, at 230, the terminal device 110 may perform a reporting of at least one beam associated with the at least one set of beams based on the beam reporting configuration. The at least one reported beam is associated with the first set of beams for beam prediction or second set of beams for beam measurement; in other words, the at least one beam is from the at least one set of beams. In some embodiments, the at least one reported beam or the beam report may include at least one of a measured beam that is determined based on the beam measurement, and a predicted beam that is determined based on the beam prediction. In an example, the at least one beam may include a predicted beam which is associated to a cell of multiple cells, for example the serving cell 120-1.

In another example, the beam report may include a measured beam associated with the serving cell 120-1 and at least one another measured beam associated with at least one another cell, for example, the cell 130-1 and the cell 140-1. Alternatively, the beam report may include a predicted beam associated with the serving cell 120-1 and a measured beam associated with at least one another cell.

In some other embodiments, the beam report may further include any other measured/predicted beams. In some embodiments, the beam report may be carried in any of uplink control information, channel state information state Information RRC signaling and MAC CE. In addition, the beam report may further include beam IDs, reference signal received power (RSRP) of a beam, beam angles for the beams associated with serving cell PCI and beams associated with at least one PCI other than the serving cell PCI, for example based on the capability information.

For the intra-cell beam prediction, the beam report may further include predicted beams associated with only one cell, for example associated with the serving cell 120-1 or with the cell 130-1. For the inter-cell beam prediction, the beam report may further include predicted beams associated with more than one cell, for example associated with the serving cell 120-1 and with the cell 130-1.

In this way, the inter-cell BM may be implemented at terminal device side, and a suitable AI or ML model may be employed by the terminal device to perform the intra-cell beam prediction and the inter-cell beam prediction. As such, the BM capability for multi-TRP/cell operation is enhanced. The performance of BM may therefore be improved by the beam prediction.

The beam reporting configuration transmitted from the network device 120 may be updated for improving the performance of the inter-cell BM. For example, it may be updated with the movement of the terminal device 110. When the network device 120 updates the beam reporting configuration, it may wholly replace or partially update the first set of beams for the beam prediction and the second set of beams for the beam measurement. At 240, the network device 120 may transmit an update indication to the terminal device 110, and the update indication indicates of updating of beams in the at least one set of beams. In some embodiments, the update indication may be indicative of: at least one of updating beams used for the beam measurement; updating beams used for the beam prediction; and updating beams associated with a specific cell.

In an example, the terminal device 110 may receive the update indication of updating certain beams. The update indication may include an update configuration of one or more beams (for example, downlink reference signal). In some embodiments, certain beams in one or more of the first subset of beams, the second subset of beams, the third subset of beams, the fourth subset of beams, the first set of beams and the second set of beams may be updated. In some embodiments, one or more of the first subset of beams, the second subset of beams, the third subset of beams, the fourth subset of beams, the first set of beams and the second set of beam may be updated. For example, the one or more beams in the update configuration may be associated with a single cell or multiple cells, such as a single PCI or multiple PCIs. Then, the terminal device 110 may replace the certain beams with the one or more beams.

In some embodiments, the beams to be updated/replaced may be indicated implicitly or explicitly. For example, the update indication to replace/update first/second/third subset/set may be implicit, where the implicit determination is done by matching the number of PCIs of update configuration. As another example, if the one or more beams in the update configuration have one PCI, it may indicate that a predefined subset of beams is replaced (for example, the third subset of beams as mentioned above). Otherwise, the one or more beams in the update configuration may replace other subsets for example the first, second subset or set of beams. Alternatively, if the one or more beams in the update configuration are only associated with cells other than the serving cell 120-1, the terminal device 110 may only update the fourth sub-set, rather than replacing the third sub-set. Alternatively, if the one or more beams in the update configuration are associated with the serving cell PCI, the terminal device 110 may update the third subset as mentioned above. Alternatively, the indication to replace/update first/second/third sub-set/set may be explicit. For example, the update indication may be indicative of the one or more beams form a prediction beam set or measurement beam set. In addition, the update indication may be carried in any of an RRC, signaling, downlink control information (DCI) and MAC CE. In this way, the inter-cell beam reporting configuration may be updated during the BM procedure.

In some embodiments, the network may configure a timer for beam updating. For example, if the timer associated with a specific beam expires, the beam may be removed from for example the first or third set. If the quality of a beam is measured over a threshold, the timer associated with the beam will be restarted. The threshold may be configured by for example the network device 120.

Figure 3:
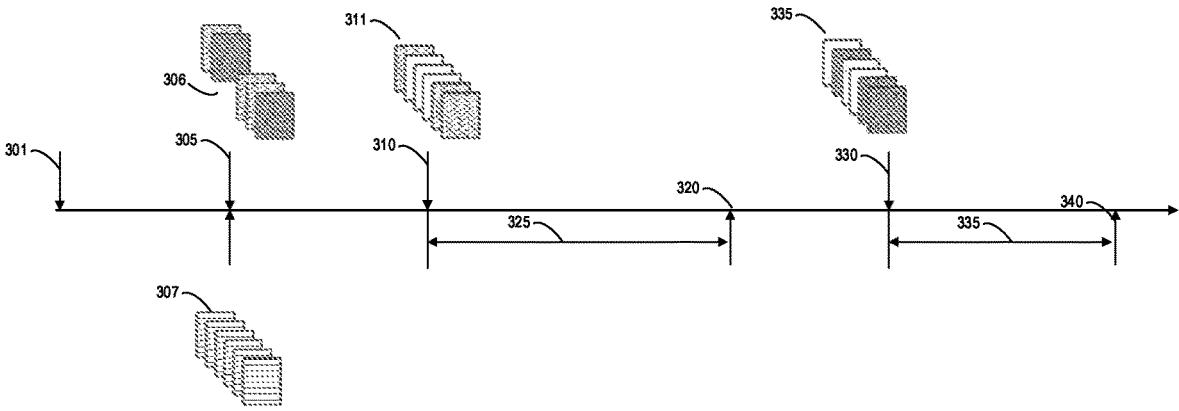
FIG. 3 is an example schematic drawing for beam reporting configuration for the BM and update of the beam reporting configuration according to some embodiments of the present disclosure.

FIG. 3 is a schematic drawing for the beam reporting configuration for the beam prediction and the update of the beam reporting configuration according to some embodiments of the present disclosure. As shown in FIG. 3, at 301, a terminal device may transmit the capability information of beam prediction as mentioned above to a network device. At 305 and 310, the terminal device 110 receives the beam reporting configuration from the network device. The beam reporting configuration may include for example the first set of beams for beam prediction and the second set of beams for the beam measurement. The first set of beams for beam prediction includes a subset of beams 311 and the second set of beams may include two subsets of beams 306 and 307, for example the subsets of beam 307 includes those measurement beams for the serving cell 120-1, and the subsets of beam 306 includes those measurement beams for cell 130-1 and cell 140-1.

In the duration shown by 325, the terminal device 110 may perform the beam measurement and the beam prediction based on the beam reporting configuration. At 320, the terminal device transmits a beam report of at least one of a predicted beam or a measured beam as mentioned above to the network device. At 330, the network device transmits an update indication to the terminal device. The update indication includes an update configuration of beams as shown by block 335. In the duration shown by 335, the terminal device updates beams based on the update indication accordingly and then the terminal device may perform the beam measurement and/or beam prediction with the updated beam reporting configuration. At 340, the terminal device transmits the new beam report to the network device.

In view of above, the inter-cell BM can be implemented at UE side efficiently and the appropriate AI or ML model can be employed to improve the capability of the inter-cell BM. The performance of BM may also be improved due to the beam can be used for communication can be effectively predicted.

Figure 4:
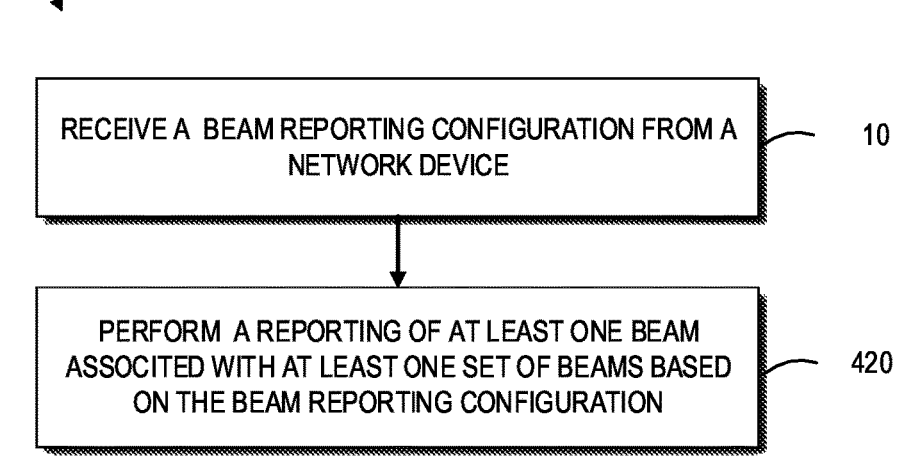
FIG. 4 illustrates an example flowchart of a method implemented at a terminal device according to example embodiments of the present disclosure.

FIG. 4 shows a flowchart of an example method 400 implemented at a terminal device (for example, the terminal device 110) in accordance with some embodiments of the present disclosure. For the purpose of discussion, the method 400 will be described from the perspective of the terminal device 110 with reference to FIG. 1.

At 410, the terminal device 110 receives a beam reporting configuration from a network device. The beam reporting configuration may indicate at least one set of beams for at least one of beam measurements or beam predictions. Each beam of the at least one set of beams may be associated with a cell of multiple cells which are able to be measured by the terminal device. At 420, the terminal device 110 performs a reporting of at least one beam associated with the at least one set of beams based on the beam reporting configuration. The at least one beam may include a predicted beam which is associated to a cell of multiple cells.

In some embodiments, the cell, may be identified by a cell identity, ID, and the cell ID may include any of a physical cell ID, PCI, and a global cell ID.

In some embodiments, the at least one set of beams may include a first set of beams for the beam prediction and a second set of beams for the beam measurement. In some embodiments, the first set of beams may include one of a first subset of beams associated with a serving cell of the terminal device or a second subset of beams associated with at least one another cell; or the first set of beams may include the first subset of beams associated with the serving cell and the second subset of beams associated with the at least one another cell. In some embodiments, the second set of beams may include a third subset of beams associated with a serving cell and a fourth subset of beams associated with the at least one another cell. In some embodiments, the at least one beam further may include a measured beam that is determined based on the beam measurement.

In some embodiments, the predicted beam may include a beam predicted for the serving cell or another beam predicted for another cell in the multiple cells. In some embodiments, the predicted beam may include the beam predicted for the serving cell and the other beam predicted for the other cell.

In some embodiments, the beam report may be carried in any of state Information a radio resource control (RRC) signaling and medium access control (MAC) control element (CE).

In some embodiments, the terminal device may be further caused to: transmit capability information on beam prediction to the network device, the capability information indicating at least one of an intra-cell beam prediction, an inter-cell beam prediction, a time domain beam prediction; or a spatial domain beam prediction.

In some embodiments, the capability information may further include at least one of a number of channel state information reference signal resource indication-reference signal received power (CRI-RSRP), which is supported to be contained in a beam report; a number of synchronization signal/physical broadcast channel block resource indication-reference signal received power (SSBRI-RSRP), which is supported to be contained in a beam report; the maximum number of configured cell identities other than from the identity of a serving cell; and the maximum number of SSB resources configured for measuring Layer 1-RSRP within a slot for at least one of the serving cell or another cell.

In some embodiments, the terminal device supports the intra-cell beam prediction, and in such a case, performing the beam prediction based on the beam reporting configuration may include performing an intra-cell beam prediction for the one of a serving cell and at least one another cell. In some embodiments, the terminal device 110 may perform the intra-cell beam prediction by: performing the beam prediction on beams in the set of beams for the beam prediction associated with one of a serving cell and another cell, based on the beam measurement on the beams associated with the one of a serving cell and another cell in the set of beams for the beam measurement.

In some embodiments, the terminal device supports the inter-cell beam prediction, and in such a case, performing the beam prediction based on the beam reporting configuration may include performing an inter-cell beam prediction for a serving cell and at least one another cell. In some embodiments, the terminal device 110 may perform the inter-cell beam prediction by: performing the beam prediction on beams in the set of beams for the beam prediction associated with one of the serving cell and the at least one another cell, based on the beam measurement on the beams associated with the one of the serving cell and the at least one another cell in the set of beams for the beam measurement; and performing the beam prediction on beams in the set of beams for the beam prediction associated with another one of the serving cell and the at least one another cell, based on the beam measurement on the beams associated with another one of a serving cell and the at least one another cell in the set of beams for the beam measurement.

In some embodiments, performing the beam prediction may be based on a machine learning (ML) or artificial intelligence (AI) model. In some embodiments, the ML or AI model may include at least one of: a ML or AI model for intra-cell beam prediction; a single ML or AI model for inter-cell beam prediction; a plurality of ML or AI models respectively for inter-cell beam prediction of multiple cells.

In some embodiments, the method may further include: the terminal device 110 receives, from the network device 120, an update indication on the beam reporting configuration indicating of updating of beams in the at least one set of beams.

In some embodiments, the update indication may be indicative of at least one of: updating beams used for the beam measurement; updating beams used for the beam prediction; and updating beams associated with a specific cell. In some embodiments, the update indication on the beam reporting configuration may be carried in any of RRC signaling and MAC CE. In some embodiments, the update may be executed by the terminal device automatically based on the configuration of timer for beam update and measurement of beam quality as descripted before.

Figure 5:
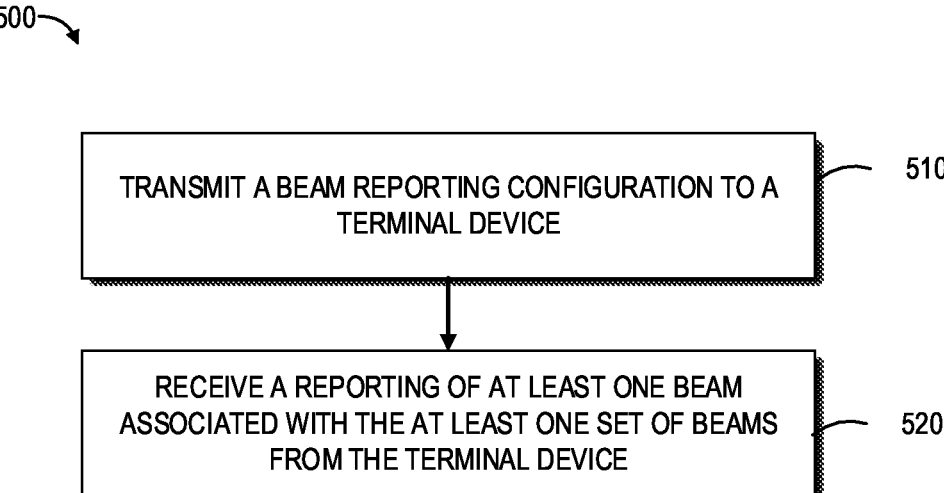
FIG. 5 illustrates an example flowchart of a method implemented at a network device according to example embodiments of the present disclosure.

FIG. 5 shows a flowchart of an example method 500 implemented at a network device (for example, the network device 120) in accordance with some embodiments of the present disclosure. For the purpose of discussion, the method 500 will be described from the perspective of the network device 120 with reference to FIG. 1.

At 510, the network device 120 transmits a beam reporting configuration to a terminal device 110. The beam reporting configuration may indicate at least one set of beams for at least one of beam measurements or beam predictions. Each beam of the at least one set of beams may be associated with a cell of multiple cells which are able to be measured by the terminal device. At 520, the network device 120 receives a reporting of at least one beam associated with the at least one set of beams from the terminal device 110. The at least one beam may include a predicted beam which is associated with a cell of multiple cells.

In some embodiments, the cell may be identified by a cell identity, ID, and the cell ID may include any of a physical cell ID, PCI, and a global cell ID.

In some embodiments, the at least one set of beams may include a first set of beams for the beam prediction and a second set of beams for the beam measurement. In some embodiments, the first set of beams includes one of a first subset of beams associated with a serving cell of the terminal device or a second subset of beams associated with at least one another cell; or the first set of beams includes the first subset of beams associated with the serving cell and the second subset of beams associated with the at least one another cell; and the second set of beams includes a third subset of beams associated with a serving cell and a fourth subset of beams associated with the at least one another cell.

In some embodiments, the at least one beam further includes a measured beam that is determined based on the beam measurement in addition to the predicted beam. In some embodiments, the predicted beam includes a beam predicted for the serving cell or another beam predicted for another cell in the multiple cells; or the predicted beam includes the beam predicted for the serving cell and the other beam predicted for the other cell.

In some embodiments, the network device 120 may be further caused to: receive capability information of beam prediction to the network device, and the beam prediction capability may include at least one of: an intra-cell beam prediction, an inter-cell beam prediction, a time domain beam prediction; and a spatial domain beam prediction.

In some embodiments, the capability information may further include at least one of: a number of channel state information reference signal resource indication-reference signal received power, CRI-RSRP, which is supported to be contained in a beam report; a number of synchronization signal/physical broadcast channel block resource indication-reference signal received power, SSBRI-RSRP, which is supported to be contained in a beam report; the maximum number of configured cell identities other than from the identity of a serving cell; the maximum number of SSB resources configured for measuring Layer 1-RSRP within a slot for at least one of the serving cell or another cell.

In some embodiments, the terminal device supports the intra-cell beam prediction, and beams of the at least one set of beams for the beam prediction may be associated with one of a serving cell and another cell.

In some embodiments, the terminal device supports the inter-cell beam prediction, beams of at least one set of beams for the beam prediction may include a first subset of beams associated with a serving cell and a second subset of beams associated with at least one another cell. In some embodiments, the beam report may be carried in any of uplink control information, channel state information, a radio resource control, RRC signaling and medium access control, MAC, control element, CE.

In some embodiments, the method may further include the network device transmits, to the terminal device, an update indication on the beam reporting configuration indicating of updating of beams in the at least one set of beams. In some embodiments, the update indication may be indicative of at least one of: updating beams used for the beam measurement; updating beams used for the beam prediction; and updating beams associated with a specific cell. In some embodiments, the update indication on the beam reporting configuration may be carried in any of RRC signaling and MAC CE.

In some embodiments, an apparatus capable of performing any of operations of the method 400 (for example, the terminal device 110) may include means for performing the respective steps of the method 400. The means may be implemented in any suitable form. For example, the means may be implemented in a circuitry or software module.

In some embodiments, the apparatus may include means for receives a beam reporting configuration from a network device. The beam reporting configuration may indicate at least one set of beams for at least one of beam measurements or beam predictions. Each beam of the at least one set of beams may be associated with a cell of multiple cells which are able to be measured by the terminal device. The apparatus further may include means for performing a reporting of at least one beam associated with the at least one set of beams based on the beam reporting configuration. The at least one beam may include a predicted beam which is associated to a cell of multiple cells.

In some embodiments, the cell may be identified by a cell identity, ID, and the cell ID may include any of a physical cell ID, PCI, and a global cell ID. In some embodiments, the at least one set of beams may include a first set of beams for the beam prediction and a second set of beams for the beam measurement. In some embodiments, the first set of beams may include one of a first subset of beams associated with a serving cell of the terminal device or a second subset of beams associated with at least one another cell; or the first set of beams may include the first subset of beams associated with the serving cell and the second subset of beams associated with the at least one another cell; and the second set of beams may include a third subset of beams associated with a serving cell and a fourth subset of beams associated with the at least one another cell. In some embodiments, the at least one beam further may include a measured beam that is determined based on the beam measurement.

In some embodiments, the apparatus further may include means for transmitting capability information on beam prediction to the network device, the capability information indicating at least one of: an intra-cell beam prediction, an inter-cell beam prediction, a time domain beam prediction; or a spatial domain beam prediction.

In some embodiments, the predicted beam may include at least one of a beam predicted for the serving cell and another beam predicted for another cell in the multiple cells. In some embodiments, the beam report may be carried in any of uplink control information, channel state information, a radio resource control, an RRC signaling and a medium access control, MAC, control element, CE.

In some embodiments, the apparatus further may include means for transmitting capability information on beam prediction to the network device, the capability information indicating at least one of: an intra-cell beam prediction, an inter-cell beam prediction, a time domain beam prediction; or a spatial domain beam prediction.

In some embodiments, the capability information further may include at least one of: a number of channel state information reference signal resource indication-reference signal received power, CRI-RSRP, which is supported to be contained in a beam report; a number of synchronization signal/physical broadcast channel block resource indication-reference signal received power, SSBRI-RSRP, which is supported to be contained in a beam report; the maximum number of configured cell identities other than from the identity of a serving cell; and the maximum number of SSB resources configured for measuring Layer 1-RSRP within a slot for at least one of the serving cell or another cell.

In some embodiments, the terminal device supports the intra-cell beam prediction, and wherein performing the beam prediction based on the beam reporting configuration may include performing an intra-cell beam prediction for the one of a serving cell and at least one another cell. In some embodiments, the method may include the terminal device 110 performs the intra-cell beam prediction by: performing the beam prediction on beams in the set of beams for the beam prediction associated with one of a serving cell and another cell, based on the beam measurement on the beams associated with the one of a serving cell and another cell in the set of beams for the beam measurement.

In some embodiments, the terminal device supports the inter-cell beam prediction, performing the beam prediction based on the beam reporting configuration may include performing an inter-cell beam prediction for a serving cell and at least one another cell. In some embodiments, the method further may include the terminal device 110 performs the inter-cell beam prediction by: performing the beam prediction on beams in the set of beams for the beam prediction associated with one of the serving cell and the at least one another cell, based on the beam measurement on the beams associated with the one of the serving cell and the at least one another cell in the set of beams for the beam measurement; and performing the beam prediction on beams in the set of beams for the beam prediction associated with another one of the serving cell and the at least one another cell, based on the beam measurement on the beams associated with another one of a serving cell and the at least one another cell in the set of beams for the beam measurement.

In some embodiments, the apparatus may further include means for performing the beam prediction based on a machine learning (ML) or artificial intelligence (AI) model. In some embodiments, the ML or AI model includes at least one of: a ML or AI model for intra-cell beam prediction; a single ML or AI model for inter-cell beam prediction; a plurality of ML or AI models respectively for inter-cell beam prediction of multiple cells.

In some embodiments, the apparatus may further include means for receives, from the network device 120, an update indication on the beam reporting configuration indicating of updating of beams in the at least one set of beams.

In some embodiments, the update indication may be indicative of at least one of: updating beams used for the beam measurement; updating beams used for the beam prediction; and updating beams associated with a specific cell. In some embodiments, the update indication on the beam reporting configuration is carried in any of an RRC signaling and an MAC CE.

In some embodiments, an apparatus capable of performing any of the method 500 (for example, the network device 120) may include means for performing the respective steps of the method 500. The means may be implemented in any suitable form. For example, the means may be implemented in a circuitry or software module.

In some embodiments, the apparatus may further include means for transmitting a beam reporting configuration to a terminal device 110. The beam reporting configuration may include at least one set of beams for at least one of beam measurements or beam predictions. Each beam of the at least one set of beams is associated with a cell of multiple cells which are able to be measured by the terminal device. The apparatus may further include means for receiving a reporting of at least one beam associated with the at least one set of beams from the terminal device 110. The at least one beam may include a predicted beam which is associated with a cell of multiple cells.

In some embodiments, the cell is identified by a cell identity, ID, and the cell ID may include any of a physical cell ID, PCI, and a global cell ID. In some embodiments, the at least one set of beams may include a first set of beams for the beam prediction and a second set of beams for the beam measurement.

In some embodiments, the first set of beams may include one of a first subset of beams associated with a serving cell of the terminal device or a second subset of beams associated with at least one another cell; or the first set of beams may include the first subset of beams associated with the serving cell and the second subset of beams associated with the at least one another cell; and the second set of beams may include a third subset of beams associated with a serving cell and a fourth subset of beams associated with the at least one another cell. In some embodiments, the at least one beam further may include a measured beam that is determined based on the beam measurement.

In some embodiments, the predicted beam may include a beam predicted for the serving cell or another beam predicted for another cell in the multiple cells; or the predicted beam includes the beam predicted for the serving cell and the other beam predicted for the other cell. In some embodiments, the network device 120 may be further caused to: receive capability information of beam prediction to the network device, the beam prediction capability comprising at least one of: an intra-cell beam prediction, an inter-cell beam prediction, a time domain beam prediction; and a spatial domain beam prediction.

In some embodiments, the capability information further may include at least one of: a number of channel state information reference signal resource indication-reference signal received power, CRI-RSRP, which is supported to be contained in a beam report; a number of synchronization signal/physical broadcast channel block resource indication-reference signal received power, SSBRI-RSRP, which is supported to be contained in a beam report; the maximum number of configured cell identities other than from the identity of a serving cell; the maximum number of SSB resources configured for measuring Layer 1-RSRP within a slot for at least one of the serving cell or another cell.

In some embodiments, the terminal device supports the intra-cell beam prediction, and beams of the at least one set of beams for the beam prediction are associated with one of a serving cell and another cell.

In some embodiments, the terminal device supports the inter-cell beam prediction, beams of at least one set of beams for the beam prediction may include a first subset of beams associated with a serving cell and a second subset of beams associated with at least one another cell. In some embodiments, the beam report is carried in any of uplink control information, channel state information, a radio resource control, an RRC signaling and a medium access control, MAC, control element, CE.

In some embodiments, the apparatus may further include means for transmitting, to the terminal device, an update indication on the beam reporting configuration indicating of updating of beams in the at least one set of beams. In some embodiments, the update indication is indicative of at least one of: updating beams used for the beam measurement; updating beams used for the beam prediction; and updating beams associated with a specific cell. In some embodiments, the update indication on the beam reporting configuration is carried in any of an RRC signaling and an MAC CE.

Figure 6:
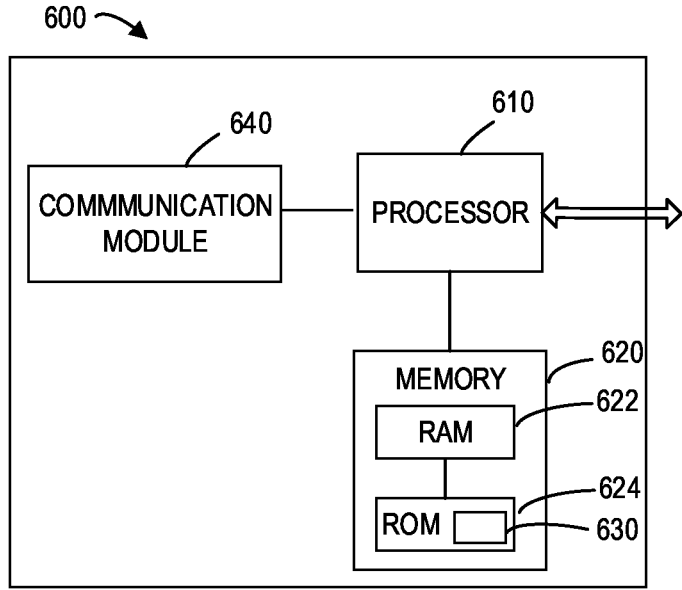
FIG. 6 illustrates an example simplified block diagram of an apparatus that is suitable for implementing embodiments of the present disclosure.

FIG. 6 is a simplified block diagram of a device 600 that is suitable for implementing embodiments of the present disclosure. The device 600 may be provided to implement the communication device, for example the terminal device 110 as shown in FIG. 1. As shown, the device 600 includes one or more processors 610, one or more memories 640 coupled to the processor 610, and one or more transmitters and/or receivers (TX/RX) 640 coupled to the processor 610.

The TX/RX 640 is for bidirectional communications. The TX/RX 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a read only memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 624. The processor 610 may perform any suitable actions and processing by loading the program 630 into the RAM 622.

The embodiments of the present disclosure may be implemented by means of the program so that the device 600 may perform any process of the disclosure as discussed with reference to FIGS. 2 to 5. The embodiments of the present disclosure may also be implemented by hardware or by a combination of software and hardware.

Figure 7:
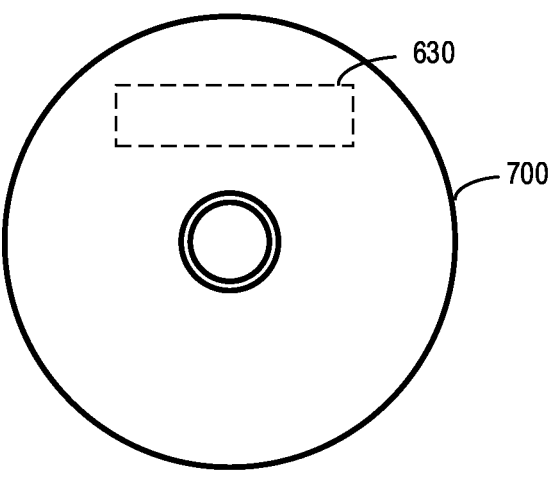
FIG. 7 illustrates an example block diagram of an example computer readable medium in accordance with some embodiments of the present disclosure.

In some embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out process 200, the method 400 or 500 as described above with reference to FIG. 2 to FIG. 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device, comprising:

at least one processor; and at least one memory including computer program codes, wherein the at least one memory and the computer program codes are configured to, with the at least one processor, cause the terminal device to:

transmit capability information on beam prediction to a network device, the capability information indicating at least one of:

an intra-cell beam prediction;

an inter-cell beam prediction;

a time domain beam prediction;

a spatial domain beam prediction;

and wherein the capability information further indicates at least one of:

a number of channel state information reference signal resource indication-reference signal received power, CRI-RSRP, which is supported to be contained in a beam report;

a number of synchronization signal/physical broadcast channel block resource indication-reference signal received power, SSBRI-RSRP, which is supported to be contained in a beam report;

the maximum number of configured cell identities other than the identity of a serving cell; or the maximum number of SSB resources configured for measuring Layer 1-RSRP within a slot for at least one of a serving cell or another cell;

receive a beam reporting configuration from the network device, the beam reporting configuration indicating at least one set of beams for at least one of beam measurements or beam predictions, wherein each beam of the at least one set of beams is associated with a cell of multiple cells which are able to be measured by the terminal device; and perform, based on the beam reporting configuration, a reporting of at least one beam associated with the at least one set of beams, wherein the at least one beam comprises a predicted beam which is associated to a cell of the multiple cells.

2. The terminal device of claim 1, wherein the at least one set of beams comprises a first set of beams for the beam prediction and a second set of beams for the beam measurement.

3. The terminal device of claim 2, wherein the first set of beams comprises one of a first subset of beams associated with a serving cell of the terminal device or a second subset of beams associated with at least one another cell; or the first set of beams comprises the first subset of beams associated with the serving cell and the second subset of beams associated with the at least one another cell; and wherein the second set of beams comprises a third subset of beams associated with a serving cell and a fourth subset of beams associated with the at least one another cell.

4. The terminal device of claim 1, wherein the at least one beam further comprises a measured beam that is determined based on the beam measurement.

5. The terminal device of claim 4, wherein the predicted beam includes a beam predicted for a serving cell or another beam predicted for another cell in the multiple cells; or the predicted beam includes the beam predicted for the serving cell and the other beam predicted for the other cell.

6. The terminal device of claim 1, wherein the terminal device supports the intra-cell beam prediction, and wherein performing the reporting based on the beam reporting configuration comprises performing an intra-cell beam prediction for one of a serving cell and at least one another cell.

7. The terminal device of claim 6, wherein the performing the intra-cell beam prediction comprises:

performing the beam prediction on beams in the set of beams for the beam prediction associated with the one of the serving cell and the at least one other cell, based on the beam measurement on the beams associated with the one of the serving cell and the at least one other cell in the set of beams for the beam measurement.

8. The terminal device of claim 1, wherein the terminal device supports the inter-cell beam prediction, and wherein performing the reporting based on the beam reporting configuration comprises performing an inter-cell beam prediction for a serving cell and at least one another cell.

9. The terminal device of claim 8, wherein the performing the inter-cell beam prediction comprises:

performing the beam prediction on beams in the set of beams for the beam prediction associated with one of the serving cell and the at least one another cell, based on the beam measurement on the beams associated with the one of the serving cell and the at least one another cell in the set of beams for the beam measurement; and performing the beam prediction on beams in the set of beams for the beam prediction associated with another one of the serving cell and the at least one another cell, based on the beam measurement on the beams associated with another one of the serving cell and the at least one another cell in the set of beams for the beam measurement.

10. The terminal device of claim 1, wherein performing the reporting is based on a machine learning (ML) or artificial intelligence (AI) model.

11. The terminal device of claim 10, wherein the ML or AI model comprises at least one of:

a ML or AI model for intra-cell beam prediction;

a single ML or AI model for inter-cell beam prediction;

a plurality of ML or AI models respectively for inter-cell beam prediction of multiple cells.

12. The terminal device of claim 1, wherein the at least one memory and the computer program codes are configured to, with the at least one processor, cause the terminal device to:

receive, from the network device, an update indication on the beam reporting configuration indicating of updating of beams in the at least one set of beams.

13. The terminal device of claim 12, wherein the update indication is indicative of at least one of:

updating beams used for the beam measurement; and
updating beams used for the beam prediction;
updating beams associated with a specific cell.

14. A network device, comprising:

at least one processor; and at least one memory including computer program codes, wherein the at least one memory and the computer program codes are configured to, with the at least one processor, cause the network device to:

receive capability information on beam prediction from a terminal device, the capability information indicating at least one of:

an intra-cell beam prediction;
an inter-cell beam prediction;
a time domain beam prediction;
a spatial domain beam prediction;

and wherein the capability information further indicates at least one of:

a number of channel state information reference signal resource indication-reference signal received power, CRI-RSRP, which is supported to be contained in a beam report;

a number of synchronization signal/physical broadcast channel block resource indication-reference signal received power, SSBRI-RSRP, which is supported to be contained in a beam report;

the maximum number of configured cell identities other than the identity of a serving cell; or the maximum number of SSB resources configured for measuring Layer 1-RSRP within a slot for at least one of the serving cell or another cell;

transmit a beam reporting configuration to the terminal device, the beam reporting configuration indicating at least one set of beams for at least one of beam measurements or beam predictions, wherein each beam of the at least one set of beams is associated with a cell of multiple cells which are able to be measured by the terminal device; and receive, from the terminal device, a reporting of at least one beam associated with the at least one set of beams, wherein the at least one beam comprises a predicted beam which is associated with a cell of the multiple cells.

15. The network device of claim 14, wherein the at least one set of beams comprises a first set of beams for the beam prediction and a second set of beams for the beam measurement.

16. The network device of claim 15, wherein the first set of beams comprises one of a first subset of beams associated with a serving cell of the terminal device or a second subset of beams associated with at least one another cell; or the first set of beams comprises the first subset of beams associated with the serving cell and the second subset of beams associated with the at least one another cell; and wherein the second set of beams comprises a third subset of beams associated with the serving cell and a fourth subset of beams associated with the at least one another cell.

17. The network device of claim 14, wherein the at least one beam further comprises a measured beam that is determined based on the beam measurement.

18. A method at a terminal device, comprising:

transmitting capability information on beam prediction to a network device, the capability information indicating at least one of:

an intra-cell beam prediction;
an inter-cell beam prediction;
a time domain beam prediction;
a spatial domain beam prediction;

and wherein the capability information further indicates at least one of:

a number of channel state information reference signal resource indication-reference signal received power, CRI-RSRP, which is supported to be contained in a beam report;

a number of synchronization signal/physical broadcast channel block resource indication-reference signal received power, SSBRI-RSRP, which is supported to be contained in a beam report;

the maximum number of configured cell identities other than the identity of a serving cell; or the maximum number of SSB resources configured for measuring Layer 1-RSRP within a slot for at least one of the serving cell or another cell;

receiving a beam reporting configuration from the network device, the beam reporting configuration indicating at least one set of beams for at least one of beam measurements or beam predictions, wherein each beam of the at least one set of beams is associated with a cell of multiple cells which are able to be measured by the terminal device; and performing, based on the beam reporting configuration, a reporting of at least one beam associated with the at least one set of beams, wherein the at least one beam comprises a predicted beam which is associated to a cell of the multiple cells.

\* \* \* \* \*